United States Patent
Raftery et al.

(10) Patent No.: US 6,685,889 B1
(45) Date of Patent: Feb. 3, 2004

(54) PHOTOCHEMICAL CATALYSTS AND METHODS FOR THEIR MANUFACTURE AND USE

(75) Inventors: Daniel Raftery, West Lafayette, IN (US); Ajit R. Pradhan, Metairie, LA (US); Megan A. Macnaughtan, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 425 days.

(21) Appl. No.: 09/736,516

(22) Filed: Dec. 13, 2000

Related U.S. Application Data

(60) Provisional application No. 60/170,691, filed on Dec. 14, 1999.

(51) Int. Cl.$^7$ ................................................ B01J 19/08

(52) U.S. Cl. ........................ 422/186.3; 502/5; 385/128

(58) Field of Search .......................... 422/186.3; 502/5; 385/128

(56) References Cited

U.S. PATENT DOCUMENTS

| | | | |
|---|---|---|---|
| 4,927,768 A | * 5/1990 | Coughlin et al. | ............ 436/172 |
| 5,468,699 A | 11/1995 | Zhang et al. | ................. 502/60 |
| 5,712,461 A | 1/1998 | Zhang et al. | .......... 204/157.15 |
| 5,790,934 A | 8/1998 | Say et al. | ..................... 422/186 |
| 5,892,861 A | * 4/1999 | Le Febre | ..................... 385/12 |
| 6,251,342 B1 | * 6/2001 | Narula et al. | ............ 422/82.07 |

OTHER PUBLICATIONS

Aelion, R. et al., (1950) *Hydrolysis of Ethyl Silicate*, J. Am. Chem. Soc. 72:5750–5712.

Bein, T. and Brown, K., (1989) *Molecular Sieve Sensors for Selective Detection at the Nanogram Level*, J. Am. Chem. Soc. 111:7640–7641.

Bein, T., (1996) *Synthesis and Applications of Molecular Sieve Layers and Membranes*, Chem. Mater. 8:1636–1653.

Blatter, F. et al., (1995) *Selective oxidation of propylene by $O_2$ with visible light in a zeolite*, Cat. Lett. 35:1–12.

Blatter, F. et al., (1996) *Highly Selective Formation of tert–Butyl Hydroperoxide from the Reaction of Isobutane and $O_2$ in a Zeolite under Visible Light*, Chem. Eur. J. 2(4):385–389.

Blatter, F. et al., (1998) *Photocatalyzed oxidation in zeolite cages*, Catal. Today 41:297–309.

Brinker, C.J. et al., (1982) *SOL–GEL Transition in Simple Silicates*, J. Non–Crystalline Solids 48:47–64.

Brinker, C.J. et al., (1985) *SOL–GEL–Glass:I. Gelation and Gel Structure*, J. Non–Crystalline Solids 70:301–322.

Centi, G. and Misono, M., (1998) *New possibilities and opportunities for basic and applied research on selective oxidation by solid catalysts: and overview*, Catal. Today 41:287–296.

Frei, H. et al., (1996) *Photocatalyzed oxidation of hydrocarbons in zeolite cages*, Chemtech 24–30.

Haw, J.F. and Xu, T., (1998) *NMR Studies of Solid Acidity*, Advances in Calalysis 42:115–180.

(List continued on next page.)

*Primary Examiner*—Kishor Mayekar
(74) *Attorney, Agent, or Firm*—William F. Bahret

(57) ABSTRACT

Photochemical catalysts and methods for their manufacture and use are provided. In one aspect of the invention, a photochemical catalyst includes an optical microfiber coated with a catalytic amount of a molecular sieve, such as a zeolite. In one preferred form, at least a portion of the outer surface of the optical microfiber is cladding-free to allow radial transmission of light to the molecular sieve coating. In another aspect of the invention, a method of making a photochemical catalyst is provided that includes depositing a catalytic amount of a molecular sieve onto an outer surface of an optical microfiber, wherein the optical microfiber is configured to transmit light to the molecular sieve. A method of photocatalysis utilizing the above-described photocatalysts includes exposing the photocatalyst and a reactant to a light source to photocatalytically react the reactant.

11 Claims, 8 Drawing Sheets-

OTHER PUBLICATIONS

Hwang, S.–J. et al., (1997) *In Situ Solid–State NMR Observations of Photocatalytic Surface Chemistry: Degradtion of Trichloroethylene*, J. Am. Chem. Soc. 119:7877–7878.

Hwang, S.–J. et al., (1998) *In Situ Solid–State NMR Studies of Trichloroethylene Photocatalysis: Formation and Characterization of Surface–Bound Intermediates*, J. Am. Chem. Soc. 120:4388–4397.

Hwang, S–J. and Raftery, D., (1999) *In situ solid–state NMR studies of ethanol photocatalysis: characterization of surface sites and their reactivities*, Catalysis Today 49:353–361.

Jansen, J.C. et al., (1998) *Zeolitic coatings and their potential use in catalysis*, Microporous and Mesoporous Materials 21:213–226.

Joy, A. and Ramamurthy, V., (2000) *Chiral Photochemistry within Zeolites*, Chem. Eur. J. 6(8):1287–1293.

Kurth, D. G. and Bein, T., (1992) *Monomolecular Layers and Thin Films of Silane Coupling Agents by Vapor–Phase Adsorption on Oxidized Aluminum*, J. Phys. Chem. 96:6707–6712.

Marinangeli, R. E. and Ollis, D. F., (1977) *Photoassisted Heterogenous Catalysis with Optical Fibers:Isolated Single Fiber*, AIChE J. 23(4):415–426.

Marinangeli, R. E. and Ollis D. F., (1980) *Photo–Assisted Heterogeneous Catalysis with Optical Fibers:Nonisothermal Single Fiber and Fiber Bundle*, AIChE J. 26(6):1000–1008.

Mirabella, F. M. Jr. (Ed.), (1993) *Principles Theory and Practice of Internal Reflection Spectroscopy*, in "International Reflection Spectroscopy Theory and Applications", Marcel Dekker, Inc., New York, New York, pp. 17–52.

Ozinskas, A. J., (1994) *Principles of Fluorescence Immunoassay*, in "Topics In Fluorescence Spectroscopy: Probe Design and Chemical Sensing," Plenum Press: New York, New York, pp. 460–488.

Peill, N. J. and Hoffmann, M. R., (1995) *Development and Optimization of a $TiO_2$–Coated Fiber–Optic Cable Reactor:Photocatalytic Degradation of 4–Chlorophenol*, Environ. Sci. Technol. 29(12):2974–2981.

Ozinskas, A. J., Peill, N. J. and Hoffmann, M. R., (1996) *Chemical and Physical Characterization of a $TiO_2$Coated Fiber Optic Cable Reactor*, Environ. Sci. Technol. 30(9):2806–2812.

Pilkenton, S. et al., (1999) *Ethanol Photocatalysis on $TiO_2$–Coated Optical Microfiber, Supported Monolayer, and Powdered Catalysis: An in Situ NMR Study*, J. Phys. Chem. B 103:11152–11160.

Pradhan, A. R. et al., (2000) *Zeolite–Coated Optical Microfibers for Intrazeolite Photocatalysis Studied by in Situ Solid–State NMR*, J. Am. Chem. Soc. 122(2):404–405.

Raftery, D. et al., (2000) *Investigation of Environmental Photocatalysis by Solid–State NMR Spectroscopy*, in "12th International Congress on Catalysis" 130A:671–676.

Ramamurthy, V. et al., (1993) *Control of Dye Assembly within Zeolites: Role of Water*, J. Am. Chem. Soc. 115:10438–10439.

Rice, C. V. and Raftery, D., (1999) *Photocatalytic oxidation of trichloroethylene using $TiO_2$ coated optical microfibers*, Chem. Commun., 895–896.

Sheldon, R. A., (1995) *Catalytic Oxidations: An Overview*, in "Catalytic Oxidation, Principles and Applications", World Scientific Publishing, Sheldon, R. A. and van Santen, R. A. (Eds.) pp. 1–15.

Sun, H. et al., (1994) *Selective Oxidation of Toluene to Benzaldehyde by $O_2$ with Visible Light in Barium (2+)– and Calcium (2+)–Exchanged Zeolite Y*, J. Am. Chem. Soc. 116:7951–7952.

Turro, N.J., (1986) *Photochemistry of organic molecules in microscopic reactors*, Pure & Appl. Chem. 58(9):1219–1228.

Xiang, T. et al., (1999) *Photooxidation of 1–Alkenes in Zeolites: A Study of the Factors that Influence Product Selectivity and Formation*, J.Am. Chem. Soc. 121:5063–5072.

Xu, Y. Langford, C.H., (1995) *Enhanced Photoactivity of a Tianium (IV) Oxide Supported on ZSM5 and Zeolite A at Low Coverage*, J. Phys. Chem. 99:11501–11507.

Xu, Y. and Langford, C.H., (1997) *Photoactivity of Titanium Dioxide Supported on MCM41, Zeolite X, and Zeolite Y*, J. Phys. Chem. B 101:3115–3121.

Yamashita, H. et al., (1996) *Photocatalytic Decomposition of NO at 275 K on Titanium Oxides Included within Y–Zeolite Cavities: The Structure and Role of the Active Sites*, J. Phys. Chem. 100(40):16041–16044.

Yoon, K.B., (1993) *Electron– and Charge– Transfer Reactions within Zeolites*, Chem. Rev. 93:321–339.

Zhang, S.G. et al., (1996) *Photoluminescence Property of Titanium Silicalite–2 Catalyst and Its Photocatalytic Reactivity for the Direct Decomposition of NO at 295 K*, Chem. Lett., 895–896.

\* cited by examiner

PHOTOCHEMICAL CATALYSTS AND METHODS FOR THEIR MANUFACTURE AND USE

The present application claims the benefit of provisional patent application Ser. No. 60/170,691, filed on Dec. 14, 1999, which is hereby incorporated by reference in its entirety. This invention was made with government support under grant number CHE 97-33188 awarded by the National Science Foundation. The Government has certain rights in the invention.

BACKGROUND OF THE INVENTION

The invention relates to photocatalytic processes utilizing molecular sieves such as zeolites. Specifically, this invention relates to photocatalysts that include optical fibers coated with particles of molecular sieves, and methods for their use in photocatalytic processes.

The use of molecular sieves, especially zeolites, in photochemistry has attracted significant interest as they host a variety of organic transformations in their cavities and channels that often leads to product distributions considerably different from those in solution (1, 2, 3, 4). Such studies have shown that zeolites provide a microenvironment for these reactions and retard dramatically back-transfer of electrons that enormously increases the lifetime of the photo-generated ion pairs. Recently, the group of Frei et al. used large-pore alkali or alkaline-earth zeolites (type Y or L), molecular oxygen, and visible light to achieve partial oxidation of small alkanes, olefins and alkylbenzenes with unprecedented selectivity (5, 6). These reactions were conducted at ambient temperature and in the absence of solvent or photosensitizers.

Oxidation reactions are one of the most important chemical processes in industry. Some of the partially oxygenated hydrocarbons find application in the manufacture of plastics and synthetic fibers and as intermediates in the synthesis of fine chemicals (7, 8) Moreover, this concept can be used to convert organic pollutants or unwanted side products such as partially hydrogenated compounds into more useful products. In order to scale-up the micromolar-quantity experiments, it is essential to improve upon the scattering of visible light by the zeolite matrix, the ability of reactants and products to diffuse through the catalyst bed, and the development of a continuous flow reaction system (6).

Although numerous literature is available on the deposition of zeolite crystallites on various substrates from a hydrothermal reaction gel, there are very few examples of three-dimensional objects that have been coated with films of pre-synthesized zeolites (9, 10). Moreover, coatings prepared by direct crystal deposition from solution often suffer from defects and poor adhesion. Therefore, there is a need for a molecular sieve-coated substrate system, such as a zeolite coated substrate system, which can decrease light scattering, improve the ease of diffusion of reactants and products, and is robust enough to tolerate the operation and severe conditions of typical commercial flow reactors. The present invention addresses this need.

SUMMARY OF THE INVENTION

It has been discovered that photocatalysts having improved photoefficiency can be synthesized by coating molecular sieves on quartz optical microfibers. Accordingly, one aspect of the invention provides a photochemical catalyst that includes an optical microfiber coated with a catalytic amount of a molecular sieve, the optical microfiber being effective to transmit light to the molecular sieve. In preferred forms of the invention, a photochemical catalyst includes an optical microfiber having at least a portion of the microfiber free of cladding, wherein a particulate molecular sieve is coated upon the cladding-free portion.

In another aspect of the invention, methods of making a photochemical catalyst are provided. In one form of the invention, a method includes bonding or otherwise depositing a catalytic amount of a particulate molecular sieve onto an outer surface of an optical microfiber, wherein the microfiber is effective to transmit light to the bonded molecular sieve. For example, at least a portion of the outer surface of the microfiber can be cladding-free, with the particulate molecular sieve bonded to the cladding-free portion.

Although a wide variety of molecular sieves are envisioned, in one preferred form of the invention, the molecular sieve is a zeolite.

In yet other aspects of the invention, the molecular sieve of the photocatalyst may include dye sensitizer molecules or other light absorbing or directing components or molecules incorporated in or otherwise anchored to the molecular sieve, preferably inside the cavities of the sieve. Such sieves form another inventive photocatalyst when anchored on an optical microfiber. Such a photocatalyst may be advantageously used to perform, for example, photosensitizer-induced electron transfer reactions. In a further form of the invention, the light absorbing or directing component may include semiconductor particles, such as $TiO_2$ or $SnO_2$, that are incorporated into the molecular sieve, or otherwise anchored inside the cavities of the molecular sieve. Alternatively, transition metal ions, such as $Ti^{4+}$, $W^{5+}$, or $V^{5+}$, may be incorporated into the framework of the molecular sieve, or grafted onto its interior surfaces.

DESCRIPTION OF THE PREFERRED EMBODIMENTS

Figure 1:
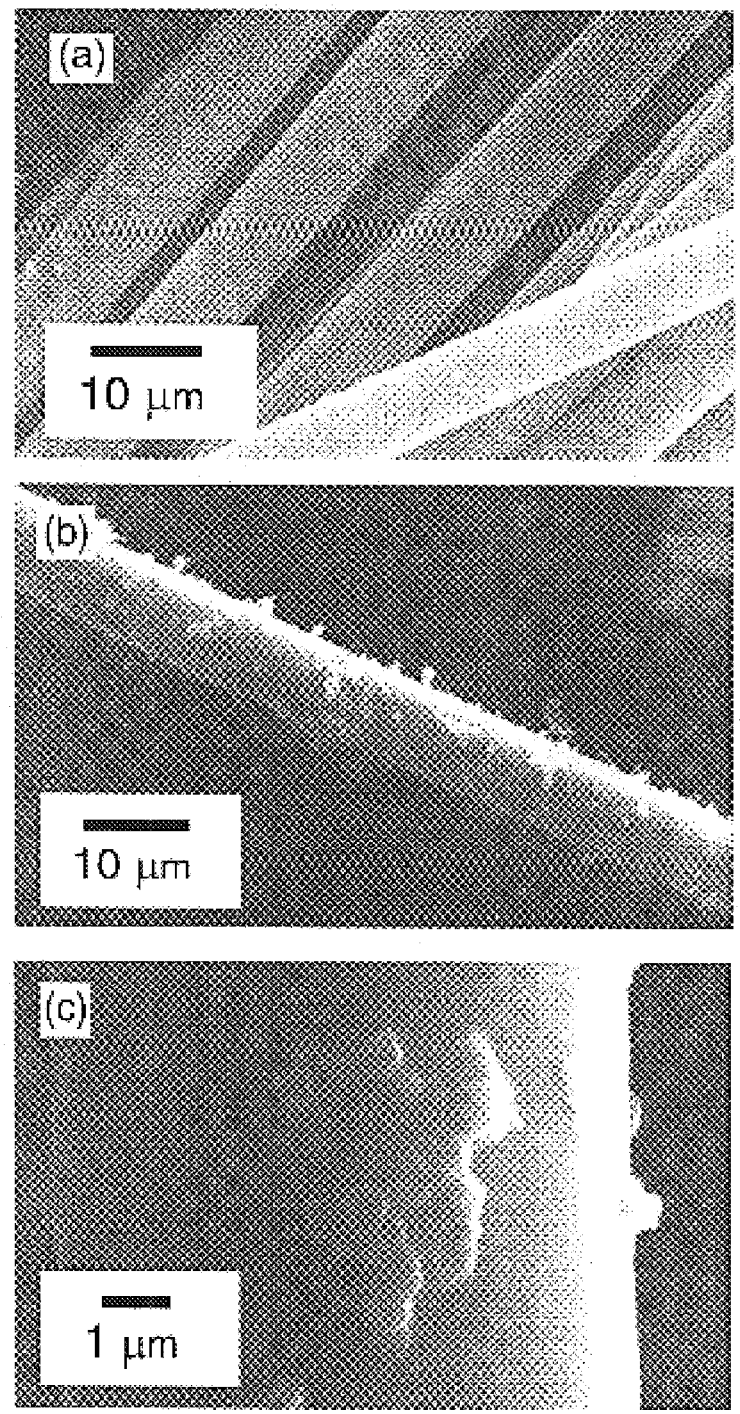
FIG. 1 depicts scanning electron micrograph images of a) bare quartz optical microfibers, b) BaY zeolite-coated optical fibers and c) a magnified image of b) as described in Example 1.

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

One feature of the invention is a new approach to conduct and study intrazeolite photochemistry, using zeolite-coated optical microfibers. Pre-synthesized and ion-exchanged zeolites, such as BaY, are coated on optical microfibers via a sol-gel process from a tetralkylorthosilicate, such as tetraethylorthosilicate (TEOS). The use of zeolite-coated optical fibers reduces light scattering by the zeolite matrix, facilitates free transport of reactant and product molecules, and creates the possibility of transferring light photons to the active sites via optical fibers. The photocatalytic efficiency is significantly increased compared to bulk powders for the selective oxidation reactions of chlorinated hydrocarbons, including trichloroethylene and methylene chloride. Moreover, the use of the coated optical microfibers provides an efficient methodology to study zeolite photochemistry with solid-state nuclear magnetic resonance (SSNMR) spectroscopy, which will be useful for a wide range of investigations.

A further feature of the invention is the ability to deliver light photons very close to the active site of the photocatalyst. This is especially important in systems displaying a turbid or dense environment (e.g., waste water treatment plants) where it may be difficult for light to reach the photocatalyst, and thus in preferred processes of the invention, such photocatalysts are utilized to conduct photocatalytic processes in turbid or dense environments.

In one aspect of the invention, photochemical catalysts are provided. In one form, a photochemical catalyst includes an optical microfiber coated with a catalytic amount of a molecular sieve. The optical microfiber is typically effective to transmit or otherwise deliver light to the molecular sieve.

The optical microfibers may be composed of a variety of materials, including quartz, glass and fused silica. Typical diameters of such fibers range from about 1 $\mu$m to about 250 $\mu$m, 1 $\mu$m to about 100 $\mu$m, 1 $\mu$m to about 20 $\mu$m, 5 $\mu$m to about 10 $\mu$m and most preferably less than 10 $\mu$m. The aspect ratio of the fibers may vary as desired. The aspect ratio may be, for example, $10^5$:1, or larger, especially where the fibers are partially cladded. In other forms of the invention, the aspect ratio may be lower than 105:1, including about 100:1 to about 10:1. Such microfibers may be obtained commercially or prepared by methods known to the skilled artisan. In certain embodiments, the optical microfibers have a first cladded portion along the length of the microfiber effective to retain substantially all light transmitted through the fiber and a second, non-cladded portion along its length effective to radiate light externally of the microfiber. Thus, at least a portion of the outer surface of the microfiber is cladding-free. The second portion of the outer surface of the fiber may advantageously be coated with a molecular sieve.

A wide variety of molecular sieves, typically pre-synthesized molecular sieves, may advantageously be used in the present invention. Such sieves have pores and/or chambers that may be sized to accommodate a variety of organic molecules and can selectively adsorb molecules based on the size and shape of the molecules. Suitable molecular sieves include, for example, mesoporous silicates (e.g. MCM-41), aluminophosphates (e.g., $AlPO_4$-5), silicoaluminophosphates (e.g., SAPO-5) and zeolites. Preferred molecular sieves are zeolites. Zeolites are typically inorganic, crystalline, porous tectometallosilicates, including tectoaluminosilicates, where oxygen bridges two tetrahedrally coordinated framework atoms. Suitable zeolites include, for example, faujasite (Y type), Linde type L (L type), Beta, MFI, mordenite, and ferrierite. Such molecular sieves may be obtained commercially or prepared by methods known to the skilled artisan.

In one form of the invention, modified zeolites may be utilized. The modified zeolites may be prepared, for example, by repeated ion-exchange of the zeolite using a variety of solutions. For example, modified zeolites may be prepared from NaY zeolite or KL by repeated ion-exchange using 0.5 N solutions of chlorides, sulfates or acetates of the $Ba^{2+}$, $Na^+$, $H^+$, $Ca^{2+}$, $Ti^{4+}$, $Sn^{4+}$, $V^{5+}$ or any other transition/alkaline earth metal ions. These ions are exchanged with the charge compensating $Na^+$ ions present in the molecular sieve framework. Although not being limited by theory, it is believed the presence of these charge compensating ions induces a high electrostatic field in the vicinity of the cations, which plays a significant role in the photochemistry of the organic reactants.

In order to form the photochemical catalyst, the optical microfibers are preferably cleaned prior to being coated with the molecular sieve. Thus, in one form of the invention, a procedure for cleaning optical microfibers, especially those that include cladding, is provided. In one form of the invention where cladded optical microfibers are used as a starting material, it is advantageous to remove a portion of the cladding (such as the polyimide coating) present on the microfibers. Cladding can be effectively removed by high temperature calcination in the presence of air/oxygen and/or acid treatment, or by other suitable methods known in the art. Suitable acids that may be utilized include sulfuric acid ($H_2SO_4$), hydrochloric acid (HCl) or nitric acid ($HNO_3$). Other possible chemicals that may be used to oxidize the cladding include hydrogen peroxide ($H_2O_2$).

As mentioned, a portion of the cladding can be removed along the length of the optical microfiber. In certain forms of the invention, at least about 10% of the surface of the microfiber is cladding-free, more preferably at least about 25%, further preferably at least about 50%, at least about 75% and more preferably at least about 90%. In other forms of the invention, the cladding is completely removed and the optical microfiber is otherwise cladding-free. The surface of the optical microfiber may be cladding free at one or more locations. For example, the surface may be cladding free towards or at one end, both ends, towards or at the middle or central portion of the fiber (i.e., in an area flanking the location along the length of the fiber that is equidistant from the ends), other regions between the aforementioned regions or combinations thereof, depending on the circumstances.

Once cleaned, the optical microfibers may then be coated with a desired molecular sieve. The molecular sieves may be coated or otherwise deposited on the optical microfibers, typically on the outer surface of the microfiber that is cladding-free, in a variety of ways, including, for example, by a sol-gel dip-coating method and by an impregnation method. In the impregnation method, optical microfibers are added to a molecular sieve/ethanol colloidal solution and the solution is evaporated to dryness to facilitate the coating process followed by a calcination procedure in the presence of a flowing gas, such as oxygen. In the dip-coating procedure, optical microfibers are added to a silica sol that includes a tetraalkylorthosilicate, such as tetraethylorthosilicate (TEOS), ethanol, a catalytic amount of an acid to act as a silicate oligomerization catalyst and the desired molecular sieve. The coated fibers may then be drained and dried in a vacuum oven to remove the ethanol solvent prior to converting the silicate films to a gel by a calcining procedure in the presence of a flowing gas, such as oxygen. In a first modified dip-coating procedure, prior to draining and drying in a vacuum oven, the optical microfiber/silica sol/molecular sieve solution is first transferred to an autoclave and heated for a temperature and a time as described below followed by a calcination procedure in the presence of a flowing gas, such as oxygen. In a second modified dip-coating procedure, the optical fibers are added to a silica sol prepared without the molecular sieve. The silicate coated fibers are drained and dried in a vacuum oven to remove the ethanol solvent and then dip-coated in a suspension of the desired molecular sieve in ethanol.

In the impregnation method, typically about 0.5 g to about 10 g of a molecular sieve, preferably about 1 g to about 2 g, is first added to about 10 moles to about 20 moles of ethanol, preferably about 10 moles to about 12 moles of ethanol. The resultant solution is stirred for about 1 hour to about 6 hours, but typically about 1 hour, to form a colloidal solution. Cleaned optical fibers in an amount of about 0.5 g to about 10 g, typically about 1 g, are then added and the solution is evaporated to dryness to facilitate the coating process. The weight ratio of the optical microfibers to the molecular sieve is typically about 1:0.3, to about 1:15, and preferably about 1:1 to about 1:10.

In a first embodiment of a sol-gel dip-coating procedure, a stock solution of silica sol is prepared by adding about 1 mole to about 5 mole, preferably about 1 mole TEOS, to about 1 mole to about 20 moles of ethanol, but preferably about 2 moles to about 10 moles of ethanol. A catalytic amount of acid is added to the silica sol as a silicate oligomerization catalyst. That is, the alcohol solution of TEOS is subjected to acid-catalyzed hydrolysis of the alkoxide groups to form —Si—O—Si— linkages. The amount of acid added will depend on the nature of the acid, but is typically added in an amount of about 0.0005 moles to about 0.01 moles per mole of TEOS. For example, when the acid is hydrochloric acid, typically about 0.0005 to about 0.005 moles, preferably about 0.001 moles, of hydrochloric acid is added. Other suitable acid catalysts include nitric acid, typically in an amount of about 0.0005 moles to about 0.01 moles per mole of TEOS, preferably about 0.001 moles of nitric acid per mole of TEOS. Base catalysts may also be used, including ammonium hydroxide. When ammonium hydroxide is utilized, typically about 0.0005 moles to about 0.02 moles of ammonium hydroxide are added to the solution per mole of TEOS.

A suspension of a molecular sieve is then prepared by adding about 0.5 g to about 10 g of a desired molecular sieve, typically about 1 g to about 2 g, to about 0.5 ml to about 20 ml, typically about 1 ml to about 5 ml of the silica sol. Preferably about 1 g to about 2 g of molecular sieve is added to about 0.005 to about 0.02 moles of TEOS. Optical microfibers are then added to the resultant solution in an amount of about 0.5 g to about 2 g. The weight ratio of the optical microfibers to molecular sieve is about 1:0.5 to about 1:4, and preferably about 1:1 to about 1:3. The solution is then diluted with about 10 moles to about 20 moles of ethanol and stirred for about 1 hour at about 298 K. The coated fibers may then be drained and dried in an oven at about 323 K to about 353 K for about 0.5 to about 2 hours to remove the solvent. The resulting silicate films may then be converted to a gel by calcining at about 753 K to about 773 K for about 8 hours to about 16 hours in the presence of a flowing gas, such as oxygen or air.

In an alternative embodiment of a sol-gel dip-coating procedure, the silica sol and molecular sieve/microfiber/sol solution are prepared as in the first embodiment of a dip coating procedure described above. However, after mixing the components, the reaction gel is stirred at about room temperature for about 1 hour to about 4 hours prior to transferring it to an autoclave, such as a teflon-coated stainless steel autoclave. The solution is subjected to a temperature of about 323 K to about 353 K for about 8 hours to about 12 hours. The coated fibers may then be further calcined at about 753 K to about 773 K for about 8 hours to about 16 hours in the presence of flowing gas, such as flowing oxygen or air.

In a further modification of a sol-gel dip coating procedure, a silica sol is prepared as described in the first embodiment and similarly includes about 0.5 g to about 2 g of optical microfibers. The mixture of silica sol and optical microfibers may be heated under constant stirring at about 323 K to about 353 K until the ethanol is evaporated to dryness, typically in about 0.5 hour to about 2 hours. The silicate-coated optical microfibers may then be dip-coated in a solution that includes about 1 g to about 2 g of molecular sieve and about 5 ml to about 20 ml of ethanol. The mixture is stirred overnight and dried in a vacuum oven at about 323 K to about 353 K for about 0.5 hour to about 2 hours prior to the calcining procedure in the presence of a flowing gas, such as oxygen as described in the first embodiment of the sol-gel dip-coating procedure described herein.

In yet another modification of the sol-gel dip-coating procedures, it has been found that controlling the rate of hydrolysis of TEOS compared to the rate of condensation of the silanol groups improves the efficiency of the coating process. For example, advantageous mole ratios of water to TEOS have been discovered that precisely control the rate of hydrolysis of TEOS as further described in Example 10. Specifically, a greater amount of molecular sieve may be coated on an optical microfiber when the mole ratio of water:TEOS is less than about 4, preferably less than about 1 and further preferably less than about 0.05. Advantageous water:TEOS weight ratios are about 0.001 to about 0.1, preferably about 0.0010.

Moreover, an optimal pH for performing the coating process to improve the efficiency of coating has also been discovered as further described in Example 10. Specifically, a greater amount of molecular sieve may be coated on an optical microfiber if the pH is about 1 to about 4, but preferably no greater than about 2.5, and most preferably no greater than about 1.7.

A wide variety of silica sources may be used to bond the molecular sieves to the optical microfibers. For example, tetraalkylorthosilicates may be used, including, for example, tetramethylorthosilicate, tetraethylorthosilicate, tetrapropylorthosilicate, sodium silicate, fumed silica, and silicic acid. TEOS is a preferred silica source.

It is also realized that, in the coating procedures described herein, including the dip-coating procedure and the impregnation method, the optical fibers may be coated one or more times, preferably at least about 3 times, as desired to increase the extent of molecular sieves coated on the optical fibers.

The optical microfibers are coated with a catalytic amount of a molecular sieve. This quantity will vary depending on a variety of factors, including the nature of the molecular sieve, whether a semiconductor, dye molecule or other molecule, sensitizer or other light absorbing, directing or gathering component is associated with the molecular sieve as discussed below and the nature of the reaction catalyzed, for example. Typically, at least about $0.5 \times 10^{-4}$ g of a molecular sieve is coated per $cm^2$ of optical microfiber surface, such as the outer surface. In other forms of the invention, about $0.5 \times 10^{-5}$ to about $1 \times 10^{-4}$ g of a molecular sieve may be coated per $cm^2$ of microfiber outer surface. Alternatively, at least about 10%, preferably at least about 25%, further preferably at least about 40%, more preferably at least about 60% and most preferably at least about 80% of the surface, such as the outer surface, of the microfiber is coated with the molecular sieve. The amount of molecular sieve coated on the surface of the microfiber is also sufficient to absorb or otherwise collect photon energy from light.

In yet other forms of the invention, photocatalysts are provided that are coated with a catalytic amount of a molecular sieve wherein the molecular sieve may include other components or molecules that aid in collecting or otherwise directing photon energy from the light source to the molecular sieve and preferably in transferring the photon energy into chemical energy. These components or molecules are preferably adsorbed, anchored or otherwise associated with the molecular sieve, either on or in the molecular sieve, but preferably within the pores of the molecular sieve.

In one form of the invention, the light collecting, absorbing, gathering or directing components or molecules are dye sensitizers. The sensitizers act like antenna for absorbing the photon energy from the light source and transferring it into chemical energy. A wide variety of dye sensitizers may be used, including cyanoaromatics, such as 1-cyanonaphthalene and 9-cyanoanthracene and ionic sensitizers, including thionin, methylene blue and rose bengal. The dye sensitizers may be incorporated into a molecular sieve, such as zeolites, by methods known to the skilled artisan, including ion-exchanged methodology as described herein. Other suitable methods of incorporating the dye sensitizer into the molecular sieve include inclusion or loading methodologies.

In another embodiment of the invention, the component may include semiconductor particles that may be incorporated on, preferably in, the molecular sieve, typically within the pores of the sieve. Suitable semiconductor particles include $TiO_2$, $SnO_2$, CdS, PbS, ZnO and combinations thereof. The particles may be anchored onto molecular sieves by methods known to the skilled artisan. For example, controlled hydrolysis at 283 K of $TiCl_4$ and $SnCl_4$ in a hexane solution may be performed in order to anchor $TiO_2$ or $SnO_2$, respectively, onto a molecular sieve.

In another embodiment of the invention, the component may include transition metal ions that may be incorporated into the framework, or grafted onto the wall of the molecular sieve, typically replacing Si or Al. Suitable transition metal ions include $Ti^{4+}$, $V^{5+}$, $W^{5+}$, $Fe^{3+}$, or $Cu^{2+}$, and combinations thereof. The transition metal ions may be anchored onto molecular sieves, or into the framework by methods known to the skilled artisan. For example, controlled hydrolysis at 300 K of $TiCl_4$ or $W(OCH_2CH_3)_5$ in a hexane solution may be performed in order to anchor Ti or W species, onto a molecular sieve.

The amount of the dye sensitizer, semiconductor or other component or molecule that may be anchored, incorporated in, or otherwise associated with the molecular sieve will depend on, for example, the nature of the component. In one form, an amount of the light gathering component effective to increase the catalytic activity of the sieve is incorporated in the sieve. It is preferred to incorporate an amount of the component or molecule that will increase the catalytic activity of the molecular sieve by at least about 20%, preferably at least about 50%, more preferably at least about 100% and most preferably at least about 200% when compared to the catalytic activity of the molecular sieve without the component or molecule.

The present invention allows the transfer of light photons to active sites of the molecular sieves via optical fibers. A variety of wavelengths of light may be transferred, including ultraviolet (about 260–400 nm) and visible light (400–700 nm). The range of transmitted light is dependent on the type of optical fibers used, and can be readily controlled by those skilled in the field.

In yet other aspects of the invention, photocatalytic reactors are provided which include the photocatalysts described above and a light source. For example, a photocatalytic reactor may include a photochemical catalyst that includes an optical microfiber coated with a catalytic amount of a molecular sieve and a light source for delivering light to the photochemical catalyst. The optical microfiber is effective to transmit light to the molecular sieve. Such photocatalytic reactors may be advantageously used to catalyze a variety of chemical reactions. Accordingly, methods of photocatalysis are provided herein.

In one form, a method of photocatalysis may include exposing to a light source a combination of a reactant and a photocatalyst wherein the photocatalyst includes an optical microfiber coated with a catalytic amount of a molecular sieve as described above. The microfiber is effective to transmit light from the light source to the molecular sieve. A wide variety of reactants, and therefore chemical reactions, may be catalyzed. For example, the photocatalyst may be used for room temperature selective oxidation or degradation of reactants including olefins, alkyl-substituted aromatic compounds, such as alkyl-substituted benzenes and alkanes by electron transfer from the hydrocarbon to the oxygen molecule induced by visible light; selective chlorination of benzene at, for example, 173 K, photodecomposition of environmental pollutants such as chlorohydrocarbons, decomposition of solvents such as alcohols, organic acids, aldehydes, ketones, valorization and mineralization of $CO_2$ and selective catalytic conversion of $NO_x$. The composite catalyst may be used to selectively oxidize or degrade organic reactants in aqueous medium or in the gaseous phase. Additionally, the photocatalyst can also be used for selective hydrogenation of olefins in the presence of water.

Methods of chemical sensing are also provided herein utilizing the molecular-sieve coated optical microfibers described herein. In one form of a method, evanescent waves are produced by total internal reflection at an interface (16). The evanescent waves that emanate from the fiber core to a porous cladding material are detected. The sensed chemical, including, for example, organic species, metal ions, or molecular oxygen, absorbs some of the light power in the evanescent wave and causes a diminution in the signal that propagates down the optical fiber. The addition of molecular sieves or zeolites to the fiber optic can add additional flexibility in the design of optical sensors. Applications include, for example, the use of zeolites to adsorb certain gases selectively, which can be detected by the fiber optic, and the use of the zeolite to support a sensing molecule, such as a dye, which can report on the presence of the target species through a change in the magnitude of the evanescent wave.

Figure 3:
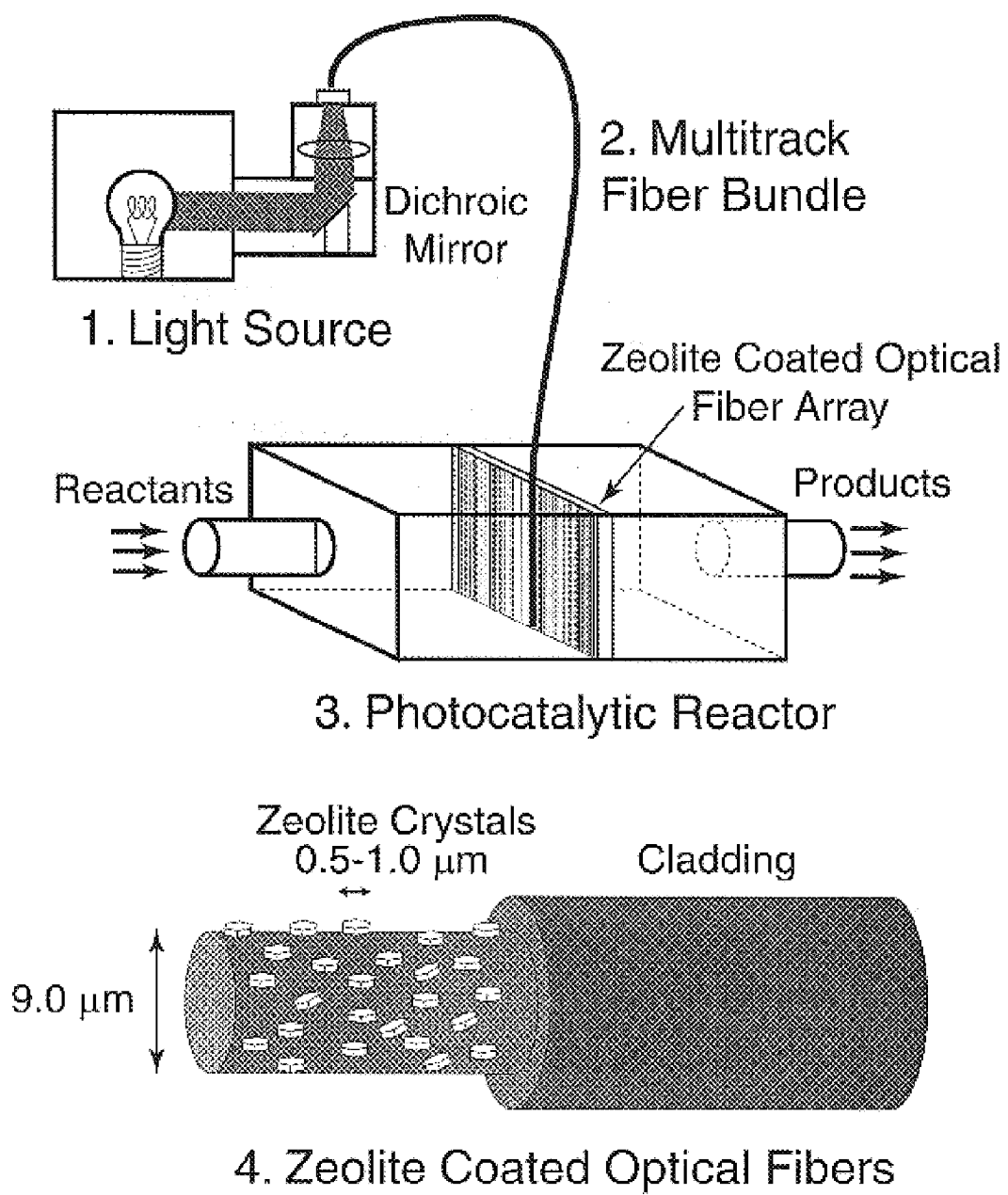
FIG. 3 shows a photocatalytic reactor set-up utilizing zeolite-coated optical microfibers as discussed in Example 9.

In addition to the light source and coated fiber technology described in FIG. 3, a detector, capable of detecting changes in the evanescent wave field is utilized. In one embodiment, for example, optical fibers that are coated with zeolites or other molecular sieves in their middle or central portion are utilized. The first section, preferably towards an end, of the fiber optic remains cladded to allow light from the source to be transported to the zeolite-coated region where the molecule of interest interacts with the evanescent wave. A final section of optical fiber is also left intact with its cladding to allow the detected light to be transported from the sensing region to the detector. Fiber optic sensors using the aforementioned technology can also be implemented using fluorescence detection (17).

Reference will now be made to specific examples illustrating the photocatalysts and methods above. It is to be understood that the examples are provided to illustrate preferred embodiments and that no limitation to the scope of the invention is intended thereby.

In Examples 1–10 below, scanning electron microscopy (SEM) and surface area estimation by Brunauer-Emmett-Teller (BET) methods were used to study the coating properties of the composite catalyst. Photocatalytic studies were performed by in situ solid state nuclear magnetic resonance spectroscopy (SSNMR) on a 300 MHz Varian Unity Plus NMR spectrometer with a double resonance magic angle spinning (MAS) probe. In a typical experiment, 60 mg of zeolite-coated optical microfibers were packed into a 5 mm glass NMR tube (Norell, Inc., Mays Landing, N.J.), which was then attached to a glass manifold. The catalyst sample was evacuated to $2 \times 10^{-5}$ Torr at 753 K and then cooled to 298 K. Typically, 30 $\mu$mol of $^{13}$C labeled hydrocarbons and 90 $\mu$mol $O_2$ were introduced on to the catalyst sample using a liquid nitrogen trap. The NMR tube was sealed off above the catalyst sample. Visible light produced by a 300 W Xe arc lamp (ILC Technology) was filtered by a dichroic mirror (Oriel Corporation, 420–630 nm) and was delivered evenly over the spinning sample via a liquid light guide (10).

The cladding present on the quartz microfibers (in this case Quartzel Fibers®; 9 $\mu$m diameter) in these Examples was effectively removed first by calcination at 753 K for 8 hours in the presence of flowing oxygen and by treatment with piranha solution (7:3 concentrated $H_2SO_4$/30% $H_2O_2$) at 363 K for 1 hour.

The ion-incorporated zeolites were prepared from NaY zeolite or KL by repeated ion-exchange using 0.5 N solutions of chlorides, sulfates or acetates of the $Ba^{2+}$, $Na^+$, $H^+$, $Ca^{2+}$, $Ti^{4+}$, $Sn^{4+}$ or $V^{5+}$. However, BaY zeolite was preferred over other ion incorporated zeolites. BaY zeolite was prepared from NaY zeolite (Zeolyst International, CBV-100, $SiO_2/Al_2O_3$=5.1) by repeated ion-exchange using a 0.5 N $BaCl_2$ solution (Alfa Aesar).

EXAMPLE 1

Preparation of Zeolite-coated Optical Microfibers by a Sol-gel Dip-coating Procedure Zeolite BaY was prepared from NaY zeolite (Zeolyst International, CBV-100, $SiO_2/Al_2O_3$–5.1) by ion-exchange using a 0.5 N $BaCl_2$ solution (Alfa Aesar). The stock solution of the silica sol was prepared by adding 5 ml TEOS and 5 ml of ethanol. A small amount of acid (about 0.5 ml of 0.04 M HCl) was added to the silica sol as a silicate oligomerization catalyst. The polyimide cladding present on the quartz microfibers (Quartzel Fibers®; 9 $\mu$m diameter) was removed as described above. The dip-coated zeolite-silica composite was prepared by adding 0.4 g of the cleaned and cut microfibers (1.5 cm length) to a suspension of 0.5 g BaY zeolite in 1.0 ml silica sol, which was then diluted with 15 ml ethanol, and stirred for 1 hour at 298 K. The coated fibers were then drained and dried in a vacuum oven at 343 K for 4 hours to remove the solvent. The resulting silicate films were converted to a gel by calcining at 753 K for 8 hours in the presence of flowing oxygen, and were locked into the particular configuration of zeolite crystals. FIG. 1 shows scanning electron micrograph images of the quartz optical microfibers before [FIG. 1(a)] and after [FIGS. 1(b) and 1(c)] coating with BaY zeolite. The SEMs reveal uniform deposition of zeolite crystals on optical microfibers. Moreover, the BET surface area of the composite catalyst is 140 $m^2$/g.

EXAMPLE 2

Preparation of Zeolite-coated Optical Microfibers by a Modified Sol-gel Dip-coating Procedure To 15 ml of ethanol, 0.5 g of BaY zeolite, 0.4 g cleaned optical microfibers and 1.0 ml of silica sol prepared as mentioned in Example 1 were added. The reaction gel was stirred at room temperature for 1 hour before transferring it to the teflon coated stainless steel autoclave. The autoclave was heated at 343 K for 12 hours. After heating, the autoclave was cooled to room temperature and the zeolite coated optical fibers were filtered and dried at 343 K for 8 hours. The dried fibers were further calcined at 753 K for 8 hours in the presence of flowing air. When the catalytic activity of this sample was tested for photooxidation of $CH_2Cl_2$ by in situ SSNMR, the results indicated 40% degradation of $CH_2Cl_2$ ($\delta$ 54.8) after 390 minutes. $CO_2$ ($\delta$ 124.4) is observed as the major product of the photocatalysis.

EXAMPLE 3

Preparation of Zeolite-coated Optical Microfibers by an Impregnation Procedure

Zeolite crystals were coated on optical fibers by the impregnation method. Typically, 0.5 g of zeolite BaY was added to 15 ml of ethanol. The solution was stirred for 1 hour to form a colloidal solution to which 1.0 g of cut and cleaned optical fibers were added. The mixture was evaporated to dryness to facilitate the zeolite coating on optical fibers. Scanning electron microscopy results suggest there is a non-uniform and loosely attached coating of zeolite particles on the optical fibers. When the catalytic activity of this sample was tested for photooxidation of $CH_2Cl_2$ by in situ SSNMR, the results indicate only 10% degradation of $CH_2Cl_2$ (δ 54.8) after 390 minutes.

EXAMPLE 4

Effect of the Type of Acid Utilized in the Preparation of Zeolite-coated Optical Microfibers by a Sol-gel Dip-coating Procedure on Catalytic Activity of the Microfibers Separate experiments were performed to measure the catalytic activity using acid (hydrochloric acid and nitric acid) and base (ammonium hydroxide) silicate oligomerization catalysts during the preparation of the zeolite coated fibers. These catalyst were prepared according to the procedure of Example 1 with the following exception: instead of 0.5 ml of 0.04 M hydrochloric acid, 0.5 ml of 0.04 M nitric acid or 1.0 ml of 5.0 M ammonium hydroxide was added while preparing the silica sol. The catalytic studies showed that the activity of the zeolite coated optical fibers prepared by various methods is comparable (within a factor of 2) to the hydrochloric acid prepared fiber catalysts.

EXAMPLE 5

Figure 2:
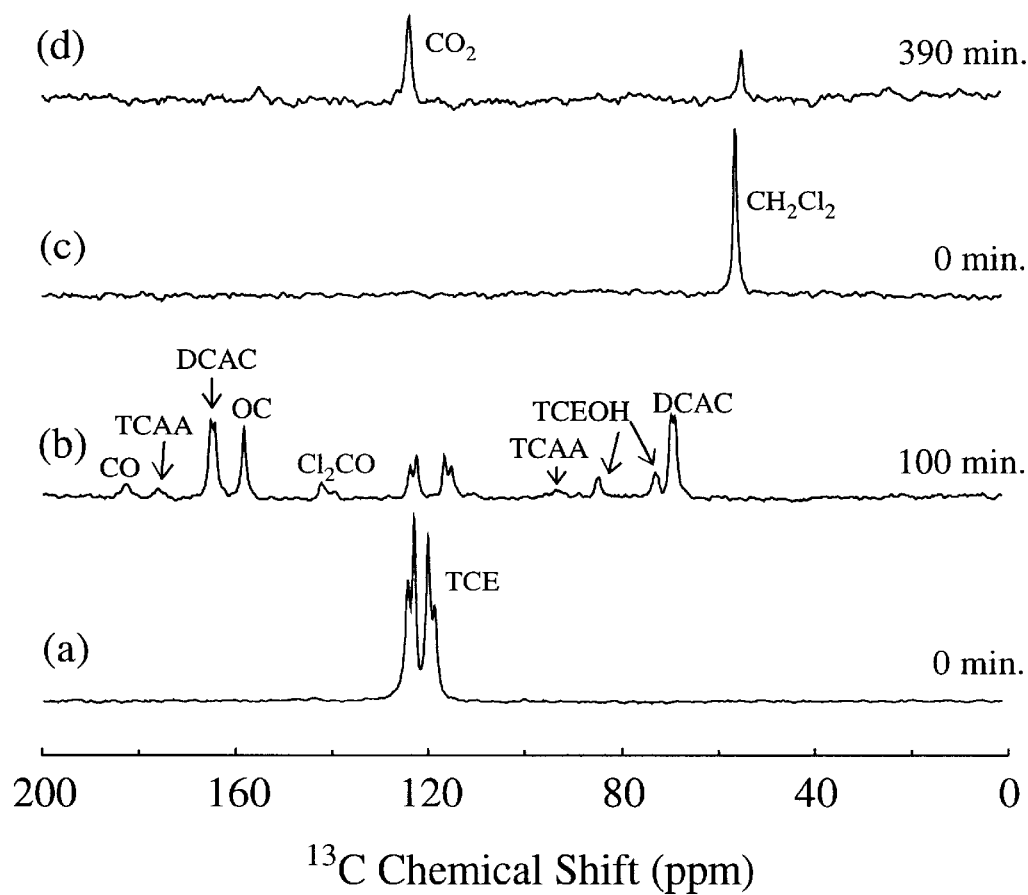
FIG. 2 depicts proton-decoupled $^{13}C$ magic angle spinning (MAS) nuclear magnetic resonance (NMR) spectra for the in situ photocatalytic oxidation of trichloroethylene (TCE) (a and b) or methylene chloride (c and d) with zeolite-coated optical microfibers prepared as described in Example 5. a) TCE and $O_2$ adsorbed on BaY-coated optical fibers before irradiation and b) after irradiation with visible light for 100 min; c) $CH_2Cl_2$ and $O_2$ adsorbed on BaY-coated optical fibers before irradiation, and d) after irradiation with visible light for 533 min. CO, carbon monoxide; $CO_2$, carbon dioxide; TCAA, trichloroacetaldehyde; DCAC, dichloroacetyl chloride; OC, oxalyl chloride; $Cl_2CO$, phosgene; TCEOH, 1,2,2-trichloroethan-2-ol.

Photocatalytic Oxidation of Trichloroethylene with Zeolite-coated Optical Microfibers $^{13}C$ MAS NMR results for the in situ photocatalytic oxidation of trichloroethylene (TCE) are presented in this example and depicted in FIG. 2. The catalyst was prepared according to the procedure outlined in Example 1 above. The narrow linewidths of the peaks indicate that TCE [FIG. 2(a)] and the photo-oxidized products [FIG. 2(b)] are quite mobile. The spectra indicate 78% degradation of TCE after 100 minutes and the formation of dichloroacetyl chloride ($Cl_2CHCOCl$, DCAC, doublets at δ 69.3 and 164.5) and oxalyl chloride (ClCOCOCl, OC, δ 158.3) as major products. Additionally, minor products 1,1,2-trichloroethan-2-ol ($Cl_2CHCHClOH$, TCEOH, doublets at δ 72.7 and 84.7), phosgene ($CCl_2O$, adsorbed δ 142.4 and gas-phase δ 139.2), trichloroactaldehyde ($CCl_3CHO$, TCAA, doublet at δ 93.0 and 176.0) and carbon monoxide (CO, δ 182.6) were also formed. The reaction intermediate TCEOH was observed to be very unstable and was converted into TCAA during storage.

The products observed over BaY-coated optical fibers in the presence of visible light is similar to that observed over semiconductor photocatalysts, such as $TiO_2$, in the presence of UV irradiation (11, 12). However, the significant concentration of oxalyl chloride formed suggests that the reaction mechanism may involve the formation of a hydroperoxide intermediate as proposed by Frei et al. (6). When the photocatalytic experiment was repeated using 40 mg BaY zeolite powder alone (i.e. without optical fibers) as the catalyst, a similar product distribution was observed; however, in situ irradiation with visible light resulted in only 34% degradation of TCE even after 533 min. The difference in the activity demonstrates the superior photocatalytic performance of the coated optical fibers versus the powder catalyst; moreover, the performance is even more significant considering that the BaY zeolite constitutes less than 50% of the composite catalyst.

EXAMPLE 6

Intrazeolite Photooxidation of Methylene Chloride with Zeolite-coated Optical Microfibers The intrazeolite photooxidation of methylene chloride ($CH_2Cl_2$) is presented in this example and depicted in FIG. 2. The catalyst was prepared as described in Example 1 above. The results in FIGS. 2(c) and 2(d) indicate 51% degradation of $CH_2Cl_2$ (δ 54.8) after 390 minutes. $CO_2$ (δ 124.4) is observed as the major product of the photocatalysis. Control experiments using BaY zeolite powder as the catalyst (i.e. without optical fibers) showed that the initial rate of $CH_2Cl_2$ degradation was roughly 20 times slower than that observed using the zeolite-coated optical fibers. This finding is significant as it suggests that compounds previously dismissed as unreactive with powder zeolites may react with coated optical fiber composite catalysts. Higher performance of the fiber catalyst can be attributed to a decrease in the light scattering due to the presence of a monolayer of zeolite particles supported on the transparent optical fibers. Moreover, loose packing of the optical fibers facilitates easy transport of reactants to the active sites and desorption of products, which significantly increases the activity of the catalyst system. In contrast to the zeolite-coated optical microfiber catalysts, the photooxidation of $CH_2Cl_2$ using $TiO_2$ is more inefficient and requires high energy UV irradiation.

EXAMPLE 7

Intrazeolite Photooxidation of Chloroform with Zeolite-coated Optical Microfibers The intrazeolite photooxidation of chloroform ($CHCl_3$) is presented in this example. The catalyst was prepared as described in Example 1 above. The results indicate complete conversion of $CHCl_3$ (δ 75.8) after 117 minutes. Phosgene is observed as the only product of the photocatalysis. Control experiments using BaY zeolite powder as the catalyst (i.e. without optical fibers) showed that in situ irradiation with visible light resulted in only 15% degradation of $CHCl_3$ even after 540 min.

EXAMPLE 8

Effect of Centrifugal Force on the Catalytic Activity of Zeolite-coated Optical Microfibers After the reaction presented in example 5 of this invention, the sealed NMR tube was broken open and the zeolite composite catalyst was regenerated in the presence of $O_2$ at 753 K for 8 hours. The fibers were repacked in the NMR tube and the catalytic activity was tested following the procedure presented earlier. It was found that the catalyst could degrade 69% of TCE during the experiment. The restoration of catalytic activity (compared to 78% over the fresh catalyst) indicates that there is no significant loss of zeolite particles from the optical fibers while spinning during the SSNMR experiments or during the regeneration process. The robust nature of this catalyst makes it an ideal component in the development of a continuous flow reactor system.

EXAMPLE 9

Photocatalytic Reactor Set-up Utilizing Zeolite-coated Optical Microfibers

One possible implementation of the zeolite-coated fiber catalysts is shown in FIG. 3. A suitable light source 1 that produces visible or possibly ultraviolet light is coupled to one end of the zeolite coated fibers that are collected in a bundle 2. This portion of the optical fiber bundle has its cladding intact to allow light to be contained within the fibers and passed onto the coated section of the optical fibers. The light is guided to the reactor 3 where the fibers are spread out to interact maximally with the reactant stream as shown in the figure. This portion of the optical fibers has been coated with the zeolites as described herein. An expanded drawing labeled 4 of FIG. 3 shows the zeolite crystallites as they are attached to the bare portion of the fiber optic.

Conclusions from Examples 1–9

It has been demonstrated herein that pre-synthesized and ion-exchanged zeolites such as BaY can be coated on optical microfibers by a sol-gel process from TEOS. The use of zeolite-coated optical fibers reduces light scattering by the zeolite matrix, facilitates free transport of reactant and product molecules, and creates the possibility of transferring light photons to the active sites via optical fibers. It also significantly increases photocatalytic efficiency compared to bulk powders. Moreover, the use of zeolite-coated optical microfibers provides an efficient methodology to study zeolite photochemistry with SSNMR, which will be useful for a wide range of fundamental investigations.

EXAMPLE 10

Optimizing the Zeolite Coating of Optical Microfibers

Materials and Methods

The quartz optical microfibers (9 μm diameter, Quartz Product Company) were supplied as a roving with each strand composed of 4800 individual fibers. The polyimide cladding present on the microfibers was removed first by calcination at 753 K for 8 hours in the presence of flowing oxygen and by treatment with piranha solution (7:3 concentrated $H_2SO_4$/30% $H_2O_2$) at 363 K for 1 hour as described above. Finally, the microfibers were rinsed with distilled water and dried.

Sample Preparation

The zeolite coating on optical microfibers was prepared by the wet impregnation method from a dispersion of 0.50 g BaY or any other modified zeolite powder in 15 ml ethanol. To this stirring mixture, 0.40 g of bare optical fibers were added. The mixture was evaporated to dryness to facilitate condensation of the zeolite particles to the optical fibers. The fibers were calcined in air at 753 K for 8 hours.

In another method, a silica sol was prepared by adding 5 ml of tetraethylorthosilicate (TEOS) and 5 ml of ethanol. A small amount of acid (about 0.5 ml of 0.04 M hydrochloric acid) was added to the silica sol as a silicate oligomerization catalyst. A mixture was prepared by combining in sequence 5 mL of ethanol, 0.50 g of BaY zeolite, 0.40 g of bare optical fibers, and 1.0 mL of silica sol. The mixture was transferred to an autoclave and maintained at 343 K under autogeneous pressure for 12 hours. The autoclave was then cooled to room temperature. The fibers were filtered, washed with ethanol, dried at 333 K in a vacuum oven, and calcined at 753 K in air for 8 hours.

Another procedure investigated for coating zeolite particles onto the optical fibers was the sol-gel process using a TEOS solution wherein silicate-coated fibers are dip-coated in a molecular sieve/ethanol solution. In a typical procedure, 0.713 g of TEOS was added to 4.0 g of ethanol under stirring. Three micromoles of HCl were added to the silica sol as the silicate oligomerization catalyst. The rate of hydrolysis of TEOS was controlled by adding appropriate amounts of water to vary the $H_2O$/TEOS mole ratio between 0.0010 (0.0010 g $H_2O$) and 16 (0.931 g $H_2O$). To the silica sol, 0.40 g of bare optical fibers were added and the mixture was allowed to settle for 12 hours. The mixture of silica sol and optical microfibers was heated under constant stirring at 343 K until the ethanol evaporated to dryness (approximately 1 hour). The silicate-coated optical fibers were then dip-coated in 0.50 g of BaY suspended in 15 ml of ethanol. The mixture was stirred overnight and dried at 343 K in a vacuum oven for 0.5 hour. The procedure of dip-coating the optical microfibers was repeated three times to improve the zeolite coating. Annealing of the zeolite particles to the optical fibers was achieved by calcining the zeolite/silicate-coated optical fibers at 753 K in air for 12 hours.

pH Effects

The effect of pH on the zeolite coating was studied. The pH of the silica ol from the sol-gel method using dip-coating was varied from 1.7 to 10.4 by adding HCl or $NH_4OH$ (28% $NH_3$) to the silica-sol solution. SEM images of the coated fibers were used to determine the optimum pH.

Characterization

The physical and chemical transformations during the conversion of the silica sol to a gel on the optical fibers was monitored by thermogravimetric analysis (TGA) at a heating rate of 10° C. $min^{-1}$ in the presence of air. SEM was used to investigate the nature and extent of the zeolite coating. The BET surface area of the zeolite-coated optical fibers under optimized reaction conditions (the sol-gel method with a $H_2O$/TEOS mole ratio of 0.0010 and three dip-coatings) was 124 $m^2$/g, while the surface area of the cleaned optical microfibers was negligible. The binding strength was evaluated by spinning the coated fibers at 2000 Hz in a solid-state nuclear magnetic resonance (NMR) probe and subjecting them to flowing water for 12 hours. SEM images of the coated fibers were used to determine the condition of the coating after these tests.

Results/Discussion

Figure 4:
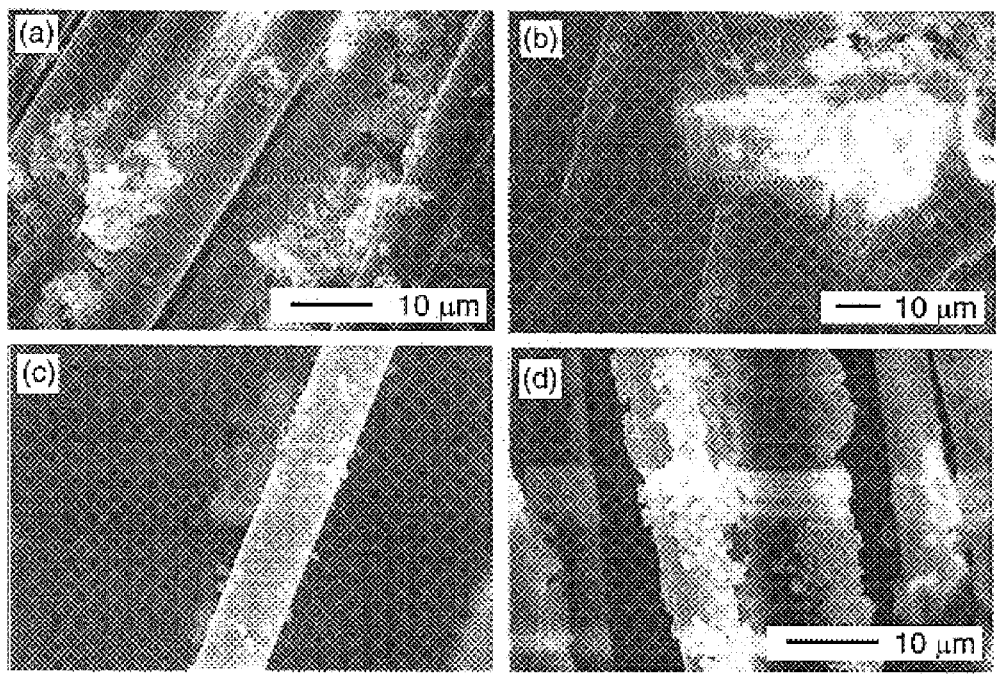
FIG. 4 depicts SEM images of BaY zeolite-coated quartz optical microfibers prepared (a) by wet impregnation from ethanol solution; (b) at autogeneous pressure from a TEOS solution; (c) using the sol-gel method from a TEOS solution with a single coating of zeolite; and (d) using the sol-gel method from a TEOS solution with three coatings of zeolite, all as described in Example 10. TEOS, tetraethylorthosilicate.

A comparison of the three methods explored for coating zeolite particles on optical microfibers is shown in the SEM images in FIG. 4. As seen in FIG. 4a, the coating of the zeolite prepared by the wet impregnation method is non-uniform. Moreover, when the sample was spun at 2000 Hz (120,000 RPM), all of the particles separated from the optical fiber surface.

FIG. 4b shows the result of coating the fibers using TEOS as the binding agent at 343 K and autogeneous pressure. It was observed that instead of coating on to the surface of the optical fibers, amorphous silica precipitated from the hydrolyzed TEOS.

Coating the fibers using the sol-gel method with dip-coating is shown in FIG. 4c. The zeolite coverage is more uniform and highly stable. Multiple coatings of zeolite particles were prepared to increase the extent of the coverage on the optical fibers. The SEM micrograph of the sample prepared with three zeolite coatings is shown in FIG. 4d.

An important objective of this study was to optimize the extent and binding strength of the zeolite particles coated on the optical microfibers. It was found that these parameters could be met by controlling the rate of hydrolysis of TEOS. It is known that the chemical transformation of the silicate gel began with hydrolysis of TEOS to form silanols. Condensation of the silanol groups occurred to form silicate polymers, which linked together to form the gel (13). The relative rates of hydrolysis and condensation depend upon three factors: the concentration of water, the concentration of TEOS, and the pH of the sol-gel (13). The effects of these parameters on the zeolite coating were studied by varying the $H_2O$/TEOS mole ratio and the pH of the gel.

Effect of H$_2$O/TEOS

Figure 5:
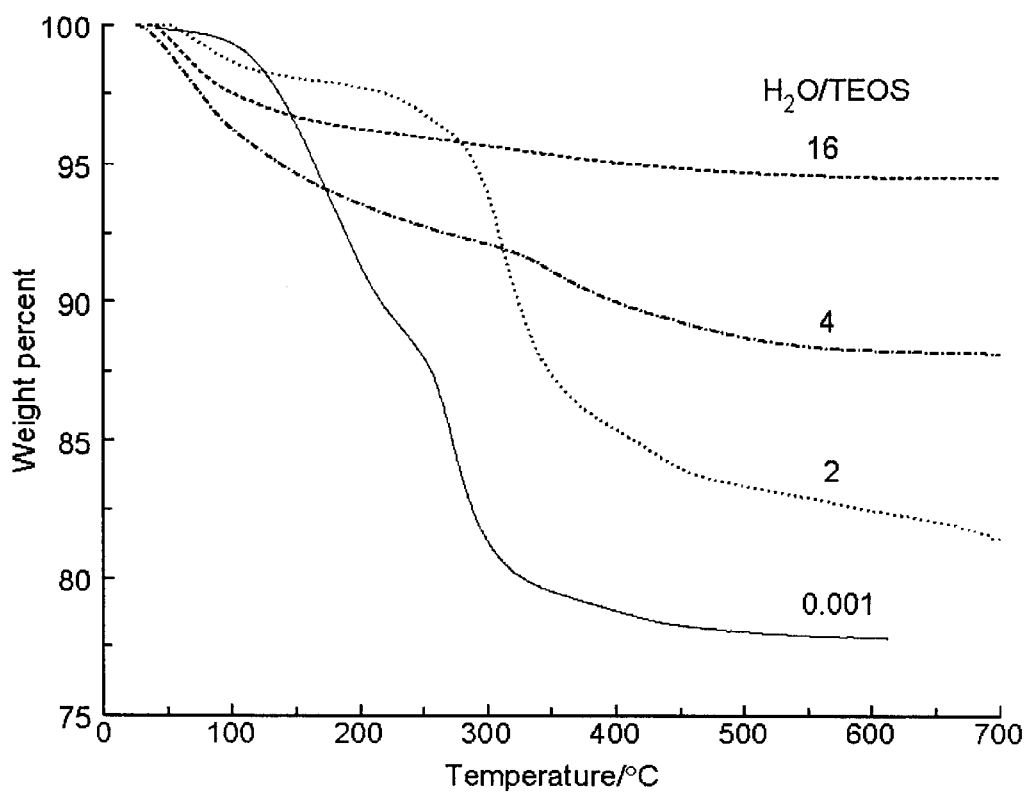
FIG. 5 depicts thermograms of silicate-coated optical microfibers prepared from the silica sol with various water contents as described in Example 10. "Weight percent" represents the weight loss from water and organic materials as explained in Example 10.

Brinker et al. have shown that by increasing the water concentration in the gel, a decrease in the bulk density and the specific surface area of the gel is observed (13). The gel behavior prior to the zeolite coating was monitored by TGA and the results are shown in FIG. 5. The thermograms can be divided into three distinct regions. Region I (T<125° C.) corresponds to desorption of physically adsorbed water and solvent, region II (125° C.–250° C.) corresponds to carbonization of residual alkoxy groups, and region III (250° C.–400° C.) is typical of carbon combustion (13). According to Brinker et al., the weight loss in region III scales with the EtO/Si ratio of hydrolyzed TEOS (13). At a low H$_2$O/TEOS mole ratio, the weight loss in regions II and III is much higher, while the corresponding loss in region I is less. At higher H$_2$O/TEOS mole ratios, these trends are reversed. The results indicate that the extent of hydrolysis of the ethoxide groups is controlled by the amount of water in the silica sol.

Figure 6:
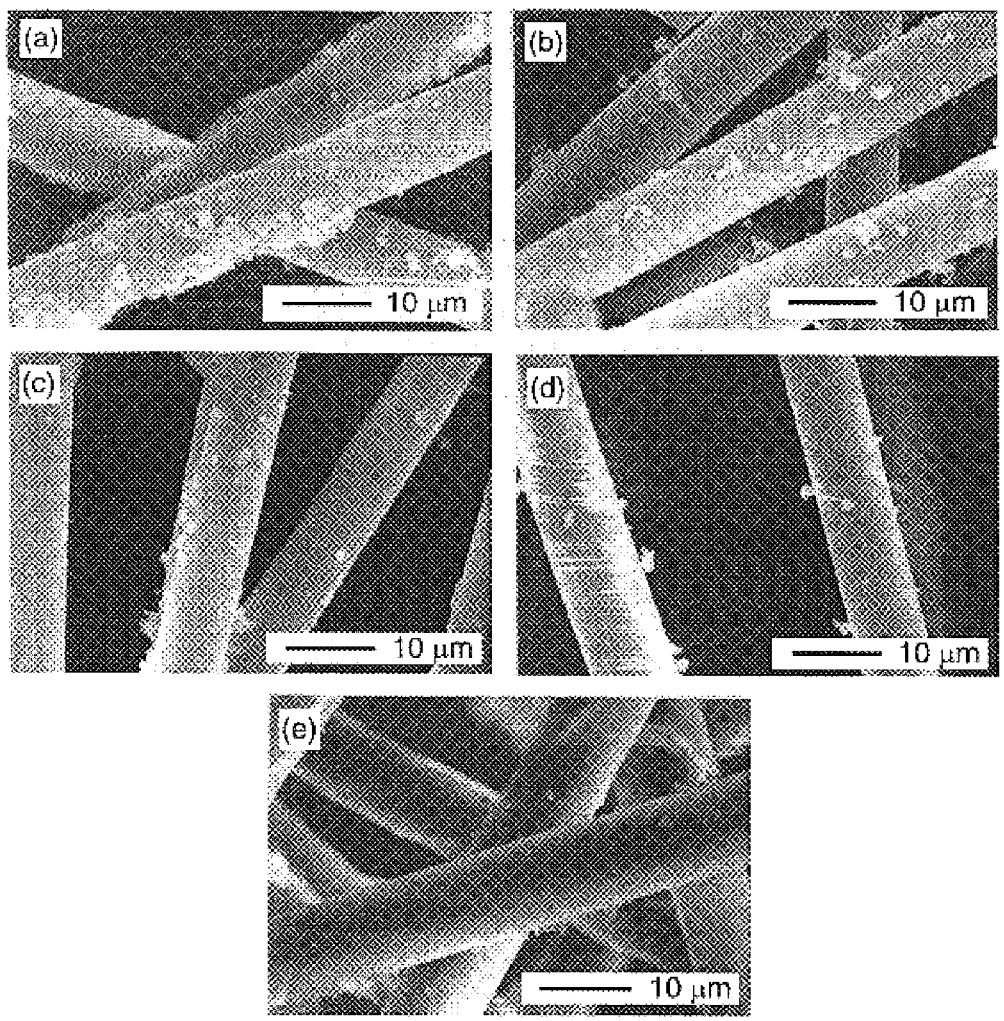
FIG. 6 shows scanning electron microscopy (SEM) images of the zeolite/silicate-coated optical microfibers prepared from the silica sol at pH 1.4 with $H_2O$/TEOS ratios of a) 0.001; b) 2.0; c) 4.0; d) 16.0 and e) similarly prepared using a $H_2O$/TEOS ratio of 0.001 at pH 10.4.

SEM micrographs of the zeolite-coated optical fiber samples prepared using silica sols with varying H$_2$O/TEOS mole ratios are presented in FIG. 6. As can be seen in the micrographs, the extent of the zeolite coating decreases with an increasing H$_2$O/TEOS mole ratio. The results indicate that the presence of ethoxide groups in the silica sol is necessary for the attachment of the zeolite particles to the optical fibers.

Figure 7:
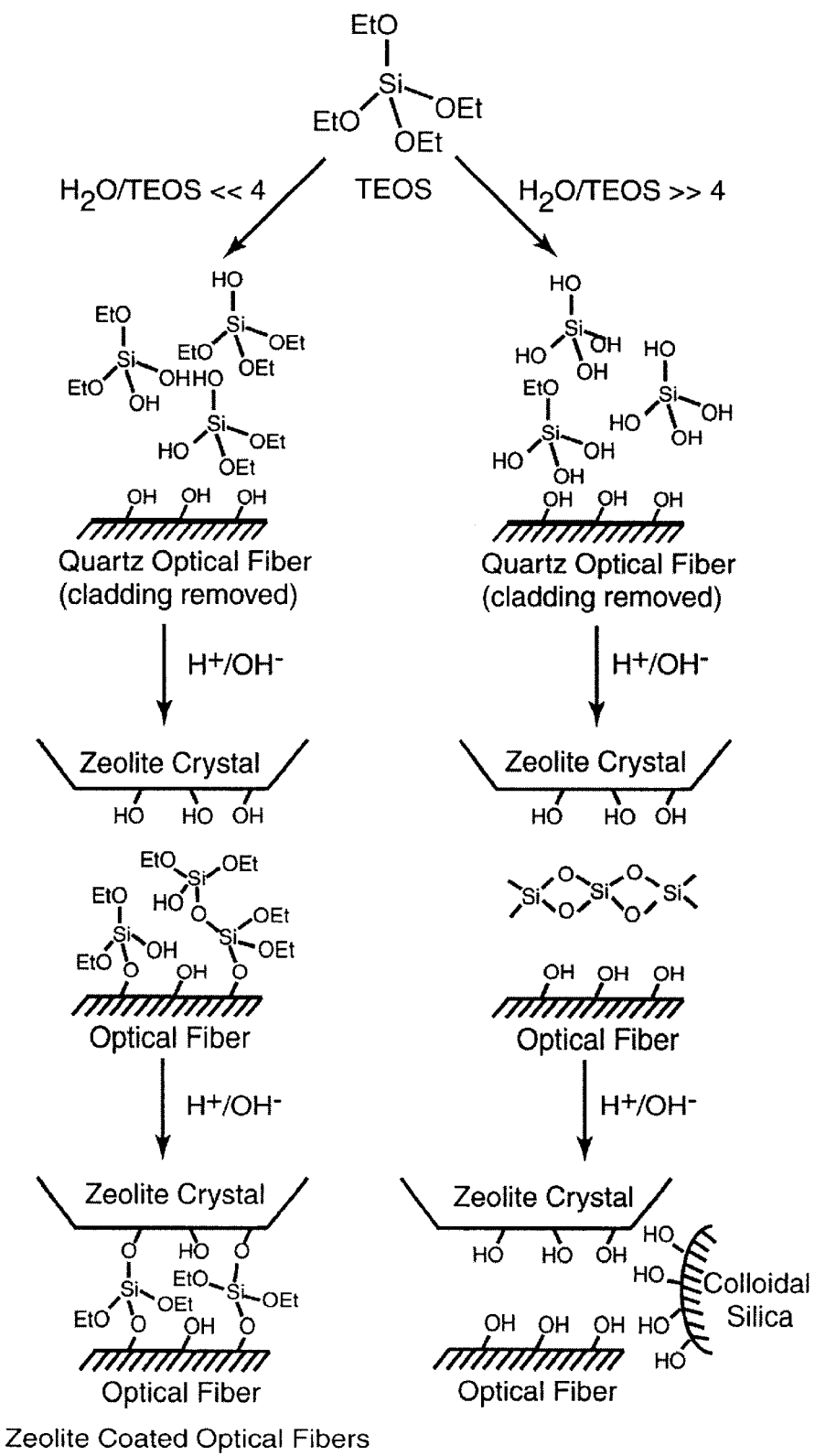
FIG. 7 depicts a schematic representation of the proposed reaction mechanism for the preparation of the zeolite-coated optical fibers prepared at various water concentrations in the gel as described in Example 10.

A possible reaction mechanism for the formation of the zeolite coating in the silica sol is presented in FIG. 7. As shown in the figure, with excess water (H$_2$O/TEOS>4) the hydrolysis of the ethoxide groups of TEOS is complete and monosilicic acid forms. In the presence of base or acid, the monosilicic acid polymerizes to form highly condensed, cross-linked SiO$_2$ (13). The result is the silica gel with a high water concentration does not act as a good binding agent for the zeolite particles because it precipitates as highly cross-linked silica gel.

On the contrary, at low concentrations of water in the silica sol (H$_2$O/TEOS<4), the rate of condensation of the silanols is much greater than the rate of their formation by hydrolysis from TEOS. The proposed mechanism of the acid-catalyzed hydrolysis of TEOS involves coordination of an acid and water molecule with TEOS followed by electrophilic attack of the alkoxide oxygen (13, 15). Hydrolysis under these conditions is sensitive to steric effects as the water substitutes from one side of the TEOS molecule while the acid stabilizes the exiting ethoxide group. Since the TEOS molecules condense while they are only partially hydrolyzed, further hydrolysis and condensation is slowed preventing the mass precipitation of SiO$_2$. Thus, the condensation reactions between the zeolite particles, the silica gel, and the quartz fibers are more favorable and result in a coating of zeolite particles on the fibers. Silanol groups of the coated silica gel on the optical fibers become anchoring centers for further zeolite dip-coatings.

Effect of pH

As the pH of the gel was varied from 1.7 to 10.4 by the addition of HCl or NH$_4$OH, the synthesis procedure resulted in an inefficient coating of the zeolite particles on to the optical fibers (see micrograph in FIG. 6e). The result can be explained by the fact that in the basic medium, hydrolysis of TEOS proceeded much more rapidly than condensation of the silanol groups resulting in the formation of silicate polymers (13). Complete hydrolysis of the alkoxides resulted in unproductive annealing of the zeolite particles to the optical fibers.

Binding Strength of the Zeolite Particles

Figure 8:
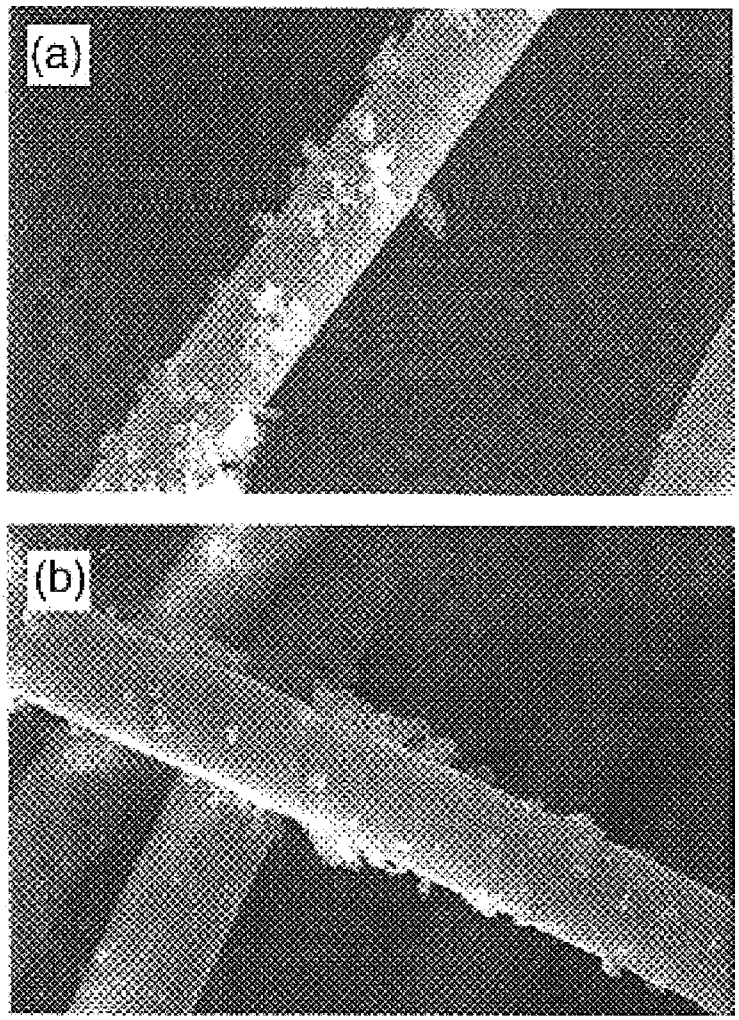
FIG. 8 shows SEM micrographs of the zeolite-coated optical microfiber sample presented in FIG. 4a after a) spinning at 2000 Hz for 12 hours and b) subjecting the fibers to flowing water for 12 hours.

Applications of zeolites to photocatalysis, environmental catalysis, chiral and other chemical synthesis, sensors, and electronic applications requires strong binding of the zeolite particles to the substrate in order to sustain operation under conditions such as strong currents of air or water. For solid-state NMR analysis, the coating on the fibers must withstand the conditions of magic angle spinning on the order of several kHz. To study the binding strength of the zeolite particles, the zeolite-coated optical fiber samples were subjected to spinning at 2000 Hz for 12 hours and to flowing water for 12 hours. The SEM micrographs of the samples after these tests are shown in FIG. 8. As can be seen in these micrographs, no noticeable change in the zeolite coating was observed after these tests. These results indicate that the zeolite coating is strong enough to sustain severe conditions required for a variety of different applications. The covalent bond between the native oxide surface of the optical fibers, the silica binder, and the zeolite particles make the coating robust (14, 18).

CONCLUSIONS

The sol-gel method for coating zeolite particles on quartz optical microfibers from a TEOS solution is effective when hydrolysis of the alkoxide groups is limited during the gel formation. The hydrolysis reaction can be mitigated by controlling the amount of H$_2$O added to the gel and the pH of the gel. The best conditions found in this study for the sol-gel method with dip-coatings is a pH of 1.7, a H$_2$O/TEOS mole ratio of 0.0010, and multiple dip-coatings. The coating obtained in this way can tolerate extreme operational conditions, such as spinning of the sample at 2000 Hz (120,000 RPM) and flowing under a stream of water, which are required for technically advanced photocatalysis or other chemical applications.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

REFERENCES

1. Turro, N. J. (1986) *Pure Appl. Chem.* 58:1219.
2. Ramamurthy, V. et al. (1998) *Chem. Commun.* 2412.
3. Yoon, K. B. (1993) *Chem. Rev.* 93:321.
4. Xiang, Y. et al. (1999) *J. Am. Chem. Soc.* 121:5063.
5. Blatter, F. et al. (1998) *Catal. Today* 41:292.
6. Frei, H. et al. (1996) *Chemtech* 24.
7. Sheldon, R. A.; van Santen, R. A.; (Eds.), in *Catalytic Oxidation, Principle and Applications*, World Scientific Publishing, Singapore, 1995.
8. Centi, G. and Misono, M. (1998) *Catal. Today* 41:287.
9. Bein, T. *Chem. Mater.* (1996) 8:1636 and references therein.
10. Jansen, J. C. et al. (1998) *Microporous and Mesoporous Materials* 21:213.
11. Hwang, S.-J. et al. (1997) *J. Am. Chem. Soc.* 19:7877.
12. Hwang, S.-J. et al. (1998) *J. Am. Chem. Soc.* 120:4388.
13. Brinker, C. J. et al. (1982) *J. Non-Crystalline Solids* 48:47.
14. Joy, A. and Ramamurthy, V. (2000) *Chem. Eur. J.* 6(8):1287.

15. Aelion, R. et al. (1950) *J. Am. Chem. Soc.* 72:5705.
16. F. Mirabella, Jr., (Ed.), in *Internal Reflection Spectroscopy*, Marcel Dekker, Inc., New York, N.Y. 1993.
17. *Topics In Fluorescence Spectroscopy: Probe Design And Chemical Sensing*, Plenum Press: New York, N.Y. 1994.
18. Brinker, C. J. (1985) *J. Non-Crystalline Solids* 70:301.

What is claimed is:

1. A photochemical catalyst, comprising:
    an optical microfiber coated along its length with a catalytic amount of a molecular sieve, said optical microfiber effective to transmit light to said molecular sieve; and
    a dye sensitizer incorporated into the molecular sieve.

2. The catalyst of claim 1, wherein said molecular sieve is a zeolite.

3. The catalyst of claim 2, wherein said zeolite is zeolite Y.

4. The catalyst of claim 1, wherein said zeolite is selected from the group consisting of zeolite Y, zeolite L, mesoporous silicates, aluminophosphates and silicoaluminophosphates.

5. The catalyst of claim 1, further including a semiconductor incorporated into the molecular sieve.

6. The catalyst of claim 1, wherein at least a portion of the outer surface of the microfiber is cladding-free.

7. A photochemical catalyst for conducting photocatalytic processes, comprising:
    an optical microfiber coated with a catalytic amount of a molecular sieve, said optical microfiber effective to transmit light to said molecular sieve;
    wherein said optical microfiber has a first, cladded portion along its length effective to retain substantially all light transmitted therethrough, and a second cladding-free portion along its length effective to radiate light externally of the microfiber, said second cladding-free portion coated with said molecular sieve and comprising at least about 25 percent of the surface area of the microfiber.

8. A photochemical catalyst, comprising:
    an optical microfiber having an outer surface having a catalytic amount of a zeolite bonded thereto along its length, said optical microfiber effective to transmit light to said zeolite; and
    a dye sensitizer incorporated into the zeolite.

9. A photochemical catalyst for conducting photocatalytic processes, comprising:
    an optical microfiber having an outer surface having a catalytic amount of a zeolite bonded thereto, said optical microfiber effective to transmit light to said zeolite, wherein said optical microfiber has a first, cladded portion along its length effective to retain substantially all light transmitted therethrough, and a second cladding-free portion along its length effective to radiate light externally of the microfiber, said second cladding-free portion coated with said molecular sieve and comprising at least about 25 percent of the surface area of the microfiber.

10. A photocatalytic reactor, comprising:
    a photochemical catalyst comprising an optical microfiber coated along its length with a catalytic amount of a molecular sieve, said optical microfiber effective to transmit light to said molecular sieve;
    a dye sensitizer incorporated into the molecular sieve; and
    a light source for delivering light to the photochemical catalyst.

11. A photocatalytic reactor for conducting photocatalytic processes, comprising:
    a photochemical catalyst comprising an optical microfiber coated with a catalytic amount of a molecular sieve, said optical microfiber effective to transmit light to said molecular sieve; and
    a light source for delivering light to the photochemical catalyst;
    wherein said optical microfiber has a first, cladded portion along its length effective to retain substantially all light transmitted therethrough, and a second cladding-free portion along its length effective to radiate light externally of the microfiber, said second cladding-free portion coated with said molecular sieve and comprising at least about 25 percent of the surface area of the microfiber.

* * * * *

UNITED STATES PATENT AND TRADEMARK OFFICE
CERTIFICATE OF CORRECTION

PATENT NO. : 6,685,889 B1
DATED : February 3, 2004
INVENTOR(S) : Daniel Raftery et al.

It is certified that error appears in the above-identified patent and that said Letters Patent is hereby corrected as shown below:

Column 4,
Line 3, change "105:1" to -- $10^5:1$ --.

Column 14,
Line 15, change "ol" to -- sol --.

Signed and Sealed this

Twentieth Day of December, 2005

JON W. DUDAS
*Director of the United States Patent and Trademark Office*